(12) United States Patent
Zhuge

(10) Patent No.: US 7,302,354 B2
(45) Date of Patent: Nov. 27, 2007

(54) CROSS-PATH CALIBRATION FOR DATA ACQUISITION USING MULTIPLE DIGITIZING PATHS

(75) Inventor: James Zhuge, Palo Alto, CA (US)

(73) Assignee: Crystal Instruments Corporation, Sunnyvale, CA (US)

( * ) Notice: Subject to any disclaimer, the term of this patent is extended or adjusted under 35 U.S.C. 154(b) by 49 days.

(21) Appl. No.: 11/392,198

(22) Filed: Mar. 28, 2006

(65) Prior Publication Data
US 2007/0239382 A1    Oct. 11, 2007

(51) Int. Cl.
*G01D 18/00* (2006.01)
(52) U.S. Cl. .................................. 702/85; 341/120
(58) Field of Classification Search ............... 702/85; 341/120, 155, 163, 118, 128; 348/572
See application file for complete search history.

(56) References Cited

U.S. PATENT DOCUMENTS

| | | | | |
|---|---|---|---|---|
| 5,164,726 A | * | 11/1992 | Bernstein et al. | 341/120 |
| 6,057,891 A | * | 5/2000 | Guerin et al. | 348/572 |
| 6,081,215 A | * | 6/2000 | Kost et al. | 341/120 |
| 6,333,707 B1 | * | 12/2001 | Oberhammer et al. | 341/155 |
| 6,825,789 B1 | * | 11/2004 | Stewart et al. | 341/155 |
| 6,970,118 B2 | | 11/2005 | Regier | 341/118 |
| 6,980,134 B2 | | 12/2005 | Ely et al. | 341/20 |

OTHER PUBLICATIONS

Anderson, Ole Thorhauge et al., "New Technology Increases the Dynamic Ranges of Data Acquisition Systems Based on 24-bit Technology," *Sound and Vibration*, Apr. 2005, pp. 8-11.

\* cited by examiner

*Primary Examiner*—John Barlow
*Assistant Examiner*—Hien Vo
(74) *Attorney, Agent, or Firm*—Law Offices of Terry McHugh

(57) ABSTRACT

The present invention utilizes multiple A/D (analog-to-digital) paths and cross-path calibration to provide accurate and reliable measurements for each input channel in a data acquisition system. When the system and method are applied, user and automated methods of selecting among a number of alternative input range settings can be reduced, or even eliminated. That is, there is a significant reduction or complete elimination of input range settings in a measurement system. For each measurement channel of interest, the input signal is directed to at least two paths, e.g., Path A and Path B. The first path measures the full range (e.g., +/-10 volts), while the second path includes a high-gain amplifier. Each path includes an analog-to-digital converter (ADC), so that there is a one-to-one correspondence between the number of paths and the number of ADCs, which sample the input signal simultaneously.

14 Claims, 4 Drawing Sheets

CROSS-PATH CALIBRATION FOR DATA ACQUISITION USING MULTIPLE DIGITIZING PATHS

TECHNICAL FIELD

The invention relates generally to high dynamic range measurement method and system, and more particularly to high dynamic range measurement for a data acquisition system.

BACKGROUND ART

In a conventional measurement system, the input range setting is one of the most important settings. For example, in an analysis system there may be a number of different input voltage range settings for each input channel. The input range setting has a direct impact on the quality of measurement, which is mainly reflected by SNR (Signal-to-Noise Ratio) or dynamic range. Users are often troubled by being unable to set the optimum range because the measured signal either is non-stationary or has an unknown amplitude. For a high channel count system having multiple relevant input ranges, it is even more difficult to get all the input ranges to their suitable value. To deal with this situation, many instruments are designed with an intelligent auto-ranging capability. "Auto-ranging" tries to set the best input range based on a certain measurement before the test actually begins. The auto-ranging can only deal with stationary or repetitive signals, i.e., those signals without many magnitude changes. For non-stationary signals such as electricity transients, auto-ranging usually does not work because each pulse may take a different magnitude. For a signal with long time history and a large range of amplitude change, auto-ranging cannot be applied at all, because during the measurement procedure it is not allowed to change the input range, i.e., the amplifier gain setting.

As described in the publication "New Technology Increases the Dynamic Ranges of Data Acquisition Systems Based on 24-Bit Technology," in SOUND AND VIBRATION, April 2005, pages 8-11, Andersen et al. state that sound and vibration transducers (e.g., microphones) have outperformed the subsequent analysis systems in linearity and dynamic performance. For such a system, the ratio between the highest and lowest signal level the system can handle is defined as its "dynamic range." The publication states that if the dynamic range is too low, high signals will typically be clipped and distorted while the low signals will typically be buried in system noise that originates from the transducer element and the electronics conditioning the transducer. As a solution, the publication describes utilizing a specialized analog input designed to provide a very high dynamic range of analog circuit pre-conditioning the transducer signal before forwarding the signal to a pair of specially designed 24-bit analog-to-digital converters (ADCs). Both data streams from the ACDs are forwarded to a digital signal processing environment, where dedicated algorithms in real-time merge the signals.

While prior art approaches operate well for their intended purposes, additional advances are sought.

SUMMARY OF THE INVENTION

The present invention utilizes multiple A/D (analog-to-digital) paths and cross-path calibration to provide accurate and reliable measurements for each input channel in a data acquisition system. When the system and method are applied, user and automated methods of selecting among a number of alternative input range settings can be reduced, or even eliminated. That is, there is a significant reduction or complete elimination of input range settings in a measurement system in accordance with the invention. As an analogy, when using a conventional voltage meter, a user must select the "best" input voltage range setting in order to achieve the most accurate voltage measurement. The voltage meter may be capable of providing measurements from a few millivolts to 500 volts, but the accuracy will depend upon the selection of the subsets of ranges within this overall range. In comparison, the system in accordance with the invention eliminates the selection of subsets.

With the present invention, for each measurement channel of interest, the input signal is directed to at least two paths, e.g., Path A and Path B. The first path measures the full range (e.g., +/−10 volts), while the second path includes a high-gain amplifier, such as one having a gain factor of 1024. Each path includes an analog-to-digital converter (ADC). Thus, the preferred embodiment includes a one-to-one correspondence between the number of paths and the number of ADCs, which sample the input signal simultaneously.

After the ADCs of the different paths convert the input signal into the digital domain, the system selects among the measurement points. When the input signal is within the range of high gain Path B, the system selects the values from Path B. On the other hand, when the magnitude of the input signal is outside the range of Path B, the system selects the values from Path A. Thus, in a two-path embodiment, a subset of measurement points is selected from Path B and the remaining measurement points are selected from Path A, so that the selected values at the measurement points are stitched into a final data stream. In one embodiment, the total dynamic range of the measurement is increased by roughly 60 dB at full range input.

If the gain factor for Path B is 1024, Path B will be saturated when the signal is greater than 10 V/1024=10 mV. If this happens, the digitized value from the ADC of Path B should not be used in forming the final data stream. Instead, the value at the corresponding measurement point of Path A is used. The selection of measurements occurs on a point-by-point basis.

There are a number of potential concerns with this implementation. The main concern involves the gain and offset errors of the different paths, including the error generated by both analog circuitry and digital circuitry. Another concern is whether the small phase difference between the different paths will cause difficulties. By using the same clock source to control the sampling rate of each ADC, the phase match can be optimized.

When addressing the concerns, the values that are of greatest importance are those at transition measurement points when the final data stream transitions from one path to another path during the "stitching" process. Without proper treatment, there will be discontinuities at the transitions. A conventional calibration process can be applied to the measurement channel of the data acquisition to reduce the absolute gain and offset errors. However, this will not solve the problems. Alternatively, in the publication "New Technology Increases the Dynamic Ranges of Data Acquisition Systems Based on 24-Bit Technology" (cited above), it is suggested to build very accurate front end circuitry, which is usually very expensive. Therefore, the present invention uses a special cross-path calibration process. It is not necessary that the cross-path calibration eliminate, or even reduce, the absolute measurement error of measurement paths. Instead, the calibration is designed to match the errors among the different paths, so that the paths will generate the measurement values as close as possible. This will allow the transition of the signal from one region to another to be very smooth during the "stitching" process.

For the cross-path calibration process, a signal source provides an input for all paths having the separate ADCs. The signal source may be either the signal that is acquired for application purposes or a special reference signal that is dedicated to calibration. The input signal must be lower than the full input range of the path with the highest gain (e.g., Path B). Consequently, all paths will measure the source signal without saturation. Even though all of the paths are capable of providing measurements of the source signal, the value from the unity gain path (Path A) will have a higher noise level as a result of the higher input range. Consequently, it is assumed that the measurement value from Path B is more credible. Other aspects of the invention will be described in the sections that follow.

DETAILED DESCRIPTION

Figure 1:
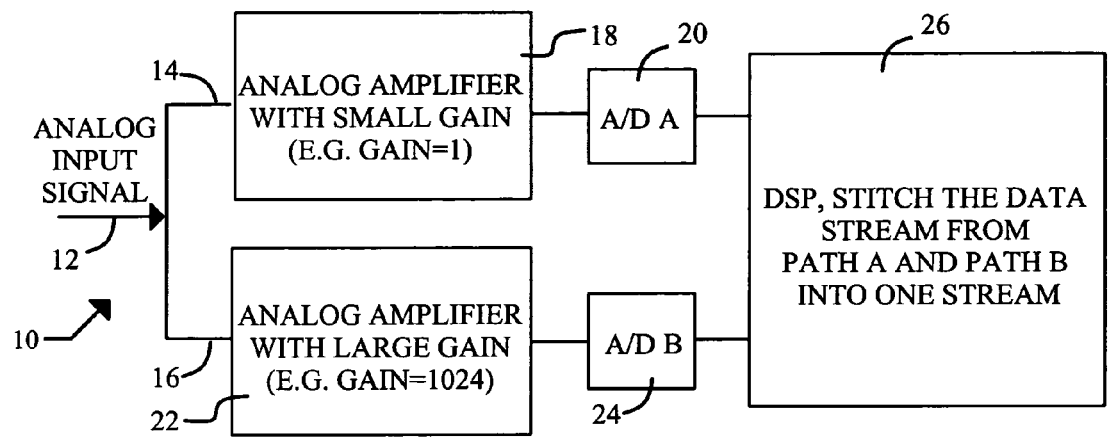
FIG. 1 is a block diagram of components in accordance with one embodiment of the invention.

With reference to FIG. 1, one embodiment of the data acquisition and measurement system 10 includes an input 12 of an analog signal and a pair of parallel paths, which will be identified as Path A 14 and Path B 16. Path A includes an analog amplifier 18 having a small gain, such as unity gain. From the analog amplifier, the signal is converted by a dedicated ADC (A/D A) 20. For Path B, the analog amplifier 22 has a more significant gain, such as a gain of 1024. The output from the amplifier is directed to a second ADC (A/D B) 24. As will be explained more fully below, additional paths may be utilized, with each path being associated with a different amplifier gain. As an alternative to the use of an amplifier, an attenuator (gain less than 1.0) may be provided along one or more path. There is a one-to-one correspondence between the ADCs and the number of paths.

The outputs from the different ADCs 20 and 24 are received by digital signal processing (DSP) unit 26. The DSP unit may include a microprocessor. Among the tasks performed by the DSP unit is the "stitching" of data points from Path A 14 to data points from Path B 16 so as to form a single final data stream. It is this final data stream that is analyzed. It is this goal that is significant, not the circuitry for achieving the goal. Thus, a field programmable gate array (FPGA) or an application specific integrated circuit (ASIC) may be used as the "unit" 26.

Path B 16 has the larger gain factor, so that it has a smaller input range. Conversely, Path A 14 has the smaller gain factor and therefore the larger input range. A general principle of the invention is that the analog input signal from input 12 is sampled by Path A and Path B simultaneously. When the signal is small and within the range of Path B, measurement values from Path B are used. On the other hand, when the signal value is outside of the range of Path B, Path B is saturated and, therefore, the measurement values from Path A are used.

Figure 2:
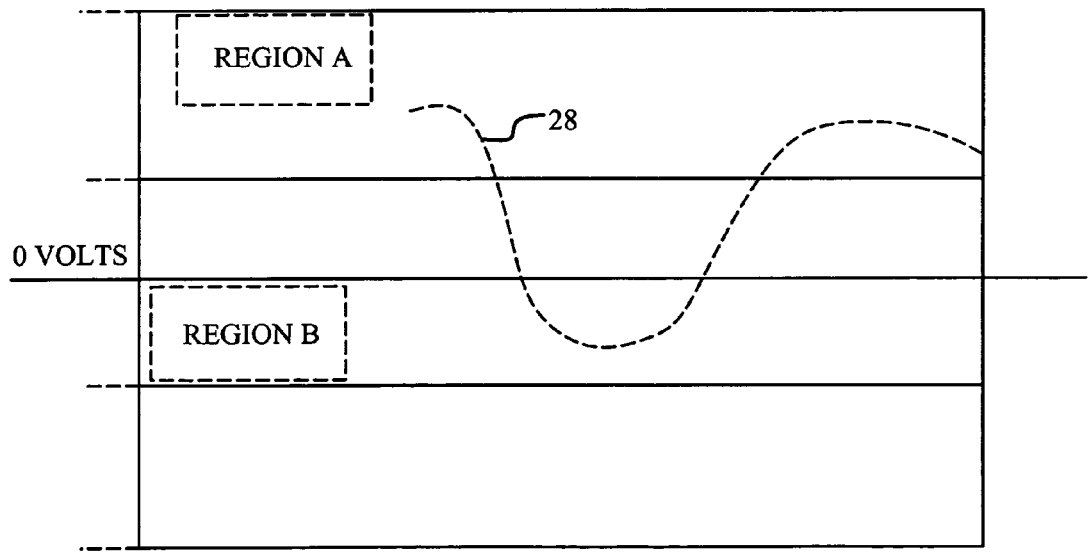
FIG. 2 is a representation of an input signal that includes two transitions from one voltage region to another voltage region.

In FIG. 2, an input analog signal 28 is shown. Region B represents the input range of Path B 16 of FIG. 1. As one possibility, Region A may be +/−10 volts, while Region B may be +/−10 volts/1024 (approximately 10 mV).

As previously noted, there are a number of potential concerns with the use of the data acquisition and measurement system 10. A main concern is that the gain and offset errors of the two paths 14 and 16 necessarily will include error generated by both the analog circuitry and the digital circuitry. Circuitry-generated errors are inherent. Without any treatment, the "stitched" signal provided by the DSP unit 26 will carry error. To some extent, the error can be reduced by use of a conventional calibration process. The goal of the conventional calibration process is to reduce the absolute measurement error of each measurement channel, so that the measured value is as close to the true value as possible. This conventional calibration process may be used as a preliminary to the cross-path calibration process to be described below. Optionally, the conventional calibration process can be conducted each time that the system 10 is initiated, before data acquisition is started. Alternatively, the conventional calibration process may be implemented on a periodic basis, such as once per month, once per year, or over a longer time period as dictated by industrial requirements. Many technologies have been developed for a one-time calibration. ISO/IEC17025 defines a one-time calibration process.

Another concern is whether a small phase difference between the two paths 14 and 16 will cause problems. Any phase difference between the two paths will reflect as time jitter in the time domain when data points are stitched into the final data stream by the DSP unit 26. Criteria must be established for the phase match of the two paths. By using the same clock source to control the sampling rate of the two ADCs 20 and 24, an acceptable phase match can be achieved.

In a cross-path calibration process in accordance with the invention, the values that are of greatest importance are those at transition measurement points when the final data stream generated by the DSP unit 26 is transitioning from Region A to Region B or from Region B to Region A.

Figure 3:
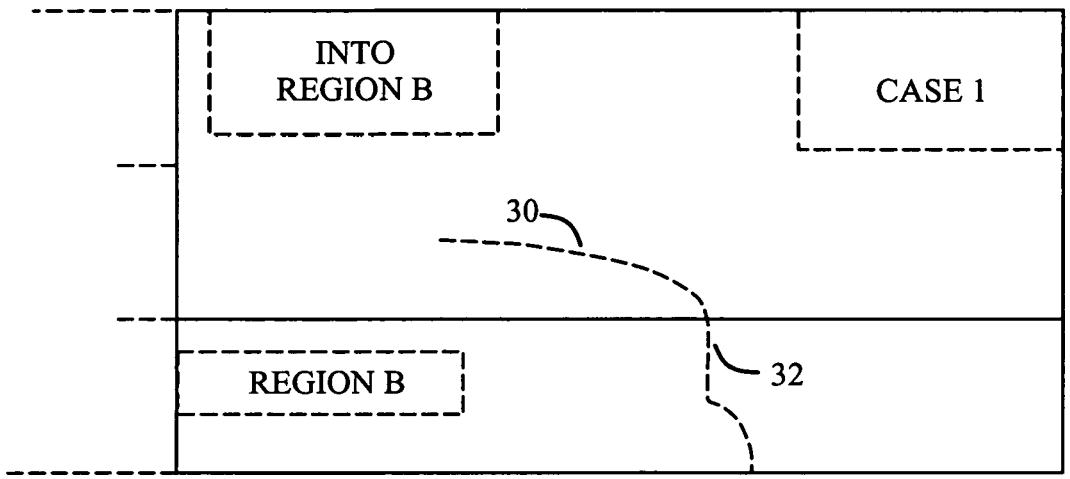
FIG. 3 is a representation of a "stitched" signal that includes a transition from voltage region A to voltage region B, wherein the signal includes a discontinuity.
Figure 4:
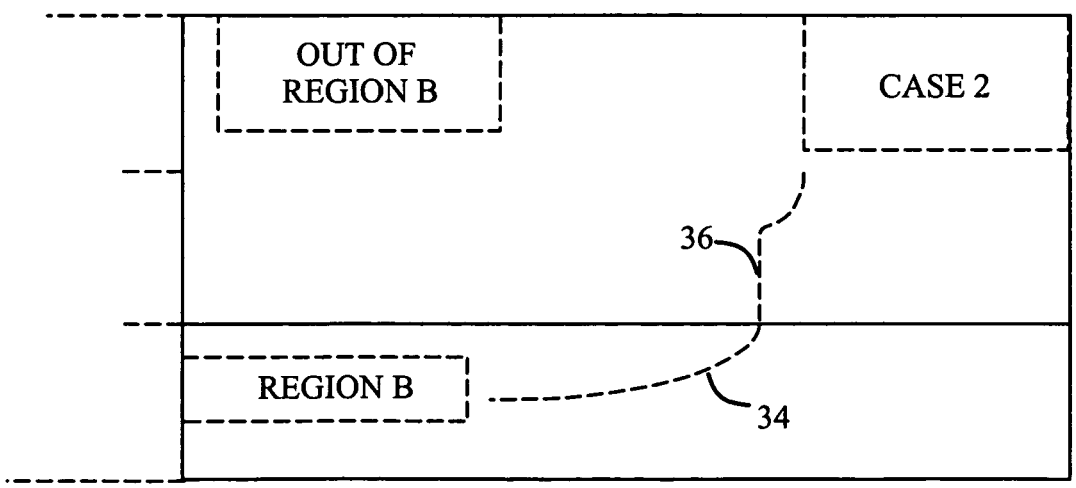
FIG. 4 is a representation of a "stitched" signal that includes a transition from voltage region B to voltage region A, wherein the signal includes a discontinuity.

FIG. 3 illustrates Case 1, wherein the "stitched" signal 30 includes a discontinuity region 32. The X axis of FIGS. 2, 3 and 4 represents time. If Path A 14 renders results different from Path B 16 at the time that the transition occurs from "best results" from Path A to "best results" from Path B, there will not be a smooth transition along the stitched measurement signal 30. Instead, the vertical discontinuity 32 will occur. Effectively, the vertical section 32 is nonexistent. FIG. 4 illustrates a stitched measurement signal 34 having a transition that occurs in an opposite direction, i.e., Case 2 is one in which the transition is out of Region B. Again, the stitched measurement signal is "flawed" by a discontinuity 36 at the transition time. Such a discontinuity is unacceptable in a typical data acquisition and measurement system.

Figure 5:
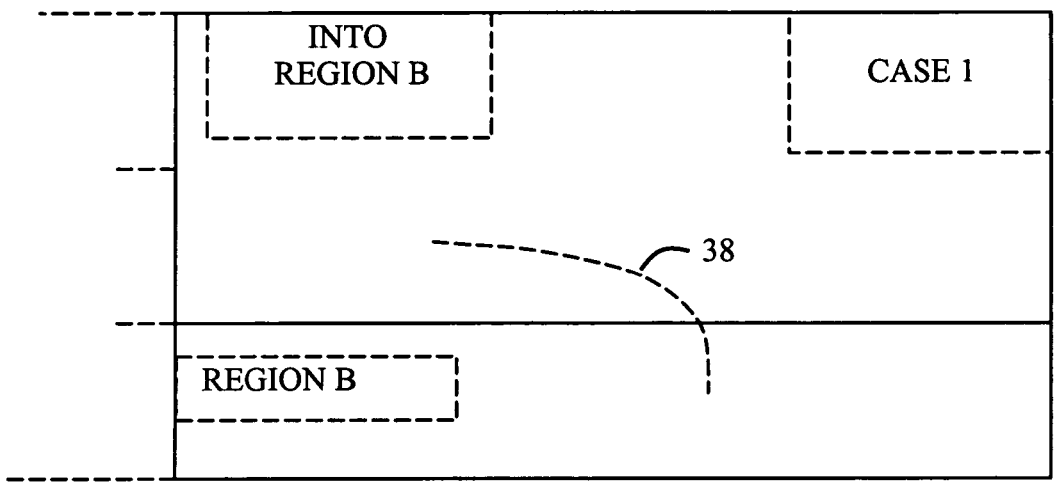
FIG. 5 is a representation of a transition similar to FIG. 3, but following the cross-path calibration in accordance with the invention.
Figure 6:
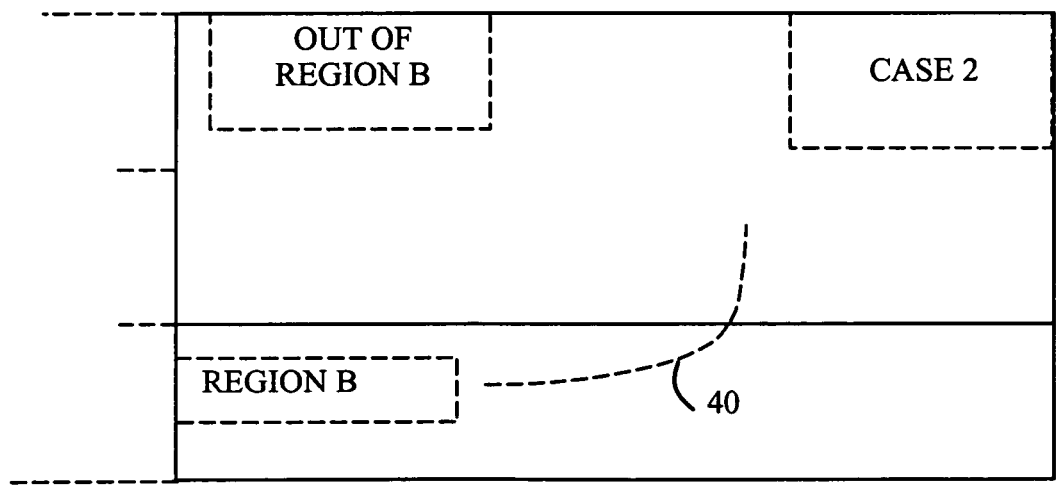
FIG. 6 is a representation of a transition similar to FIG. 4, but following the cross-path calibration in accordance with the invention.

A goal with the cross-path calibration process in accordance with the invention is to provide a smooth transition in the stitched measurement signal. FIGS. 5 and 6 represent smooth transitions in Case 1 and Case 2 stitched measurements signals 38 and 40. One approach to providing the cross-path calibration is to use a dedicated signal source. The signal source could provide a known reference signal. Alternatively, Path B 16 may be used to calibrate Path A 14 while the data acquisition is running in real-time. This may be referred to as "on-line cross-path calibration processing." If the signal amplitude is outside of Region B, the data value from Path B is invalid. Therefore, the on-line cross-path calibration processing may be used only if the signal values that are within Region B are used to calibrate Path A. Any signal values outside of Region B will be disregarded during the calibration.

Figure 7:
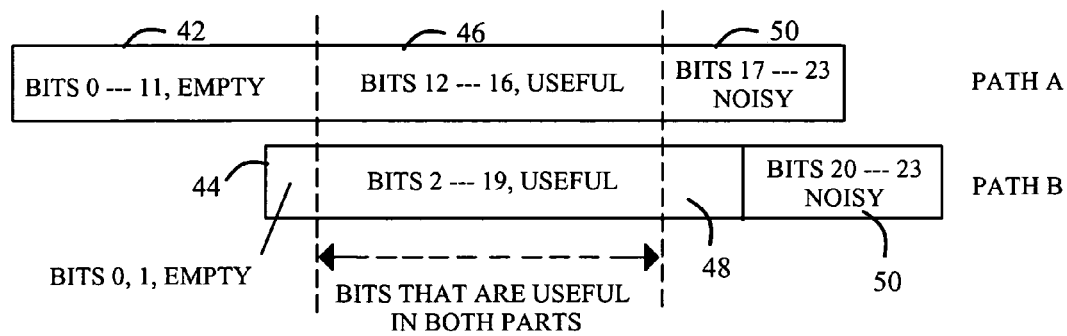
FIG. 7 is a representation of the categories of empty bits, useful bits and noise bits in the digitization along the two paths of FIG. 1.

FIG. 7 represents the difference in the usefulness of bits with respect to Path A and Path B. Some of the bits from each ADC 20 and 24 will be "empty" because the signal level is too low. In FIG. 7 the groups of bits are identified as Empty Bits, Useful Bits and Noise Bits. Empty bits 42 and 44 are those bits from an ADC that have no value. Useful Bits 46 and 48 are those bits that are not empty and are not contaminated by the noise. Noise Bits 50 and 52 are those contaminated by the noise and are not trustful.

In this example, there are totally five Useful Bits 46 in Path A 14 and seventeen Useful Bits 48 in Path B 16. The other bits are either empty or noisy. There will be several sources of measurement errors: (1) errors from the limited Useful Bits, which is called quantization effect; (2) non-linearity of the measurement path; and (3) noise impact to the estimated gain and offset errors.

Assume the measurement system 10 is linear. Then, the relationship between the measurement value and its true value can be described as:

$$Y=K*X+B$$

where X is the true value and Y is the measurement value. The value (1.0−K) is referred to as gain error, while B is the offset error.

With two measurement paths, we have:

$$Ya=Ka*X+Ba$$

$$Yb=Kb*X+Bb$$

where X is the true value, Ka and Kb are the gain of Path A and Path B, respectively, and Ba and Bb are the offset of Path A 14 and Path B 16. After the conventional calibration, Ka and Kb can be adjusted to as close to 1.0 as possible, while Ba and Bb as close to 0.0 as possible.

Using the present invention, the analog gain factor of the second path 16 is designed so that there is sufficient overlap of Useful Bits 46 and 48 for the two ADCs 20 and 24. By using these Useful Bits, the system 10 seeks to match the gain error and offset error. After the match, the measurement of "Bits that are useful in both paths" will be as "close as possible."

The cross-path calculation can be described as follows: When the signal is in the Region B (i.e., within the input range of Path B 16), it is assumed that the Yb measurement is the "best guess" for the true value. This measurement is better than that from Path A because there are more Useful Bits. Therefore, the problem becomes a simple question of what is Ka and Ba by giving a list of measurements:

$$Ya=Ka*Yb+Ba$$

In theory, if only two sets of measurement values are available, Ka and Ba can be determined. Once Ka and Ba are determined, it can be said that Path A 14 is calibrated based on Path B 16. Assume two sets of measurement values are: Ya1, Ya2, Yb1, Yb2. Then, Ka and Kb can be calculated as:

$$Ya1=Ka*Yb1+Ba$$

$$Ya2=Ka*Yb2+Ba$$

Hence:

$$Ka=(Ya1-Ya2)/(Yb1-Yb2)$$

$$Ba=Ya1-Yb1*(Ya1-Ya2)/(Yb1-Yb2)$$

Once Ka and Kb are known, they will be applied back to measurement value Ya, so it more closely approximates the true value. This adjustment can be described as:

$$\text{Calibrated value}=(Ya-Ba)/Ka$$

Once this adjustment is performed, the data points for Path A are cross-path calibrated.

In practice, a more sophisticated model will be used to estimate Ka and Ba. For example, hundreds of measurements can be taken and LMS (least-mean-square) or other approximation methods can be used to give the best estimates of Ka and Ba. A periodic signal, such as a saw-tooth or a sine wave, that goes both negative and positive will probably provide the best estimate.

Regardless of the algorithmic model, the goal of cross-path calibration is to adjust the gain and offset of Path A, so that the measurement value of Path A is close to that from Path B, based on a sequence of measured values from both paths while the signals are in the B path range. After Ka and Ba are estimated, all measurements of Path A will be calibrated by Ka and Ba and then merged with the measurement taken on Path B.

The example described above assumes that two constants, Ka and Ba, are sufficient to describe the linear relationship between Yb and its true value. More sophisticated models are also contemplated.

The primary concerns are the transition values. Without cross-path calibration, there will be sharp discontinuities at the transition due to offset and gain errors. FIGS. 3 and 4 show the effect. With cross-path calibration, the transition discontinuity will be greatly reduced as shown in FIGS. 5 and 6.

Case 2 shows that the signal is first in Region B, then it rises to "Out of Region B". Using the method described above, when the signal is in Region B, Ka and Ba are estimated. Then, Ka and Ba are used to calculate Ya, once they enter the "Out of Region B". This can be done in real-time while data is being acquired.

Case 1 is more complicated than Case 2, because the data points that are used to estimate Ka and Ba occur after the transition. The cross-channel calibration adjustment must be applied to the HISTORICAL data series, i.e., the old data. This can be done because data has been acquired. The software can retrieve data to the extent necessary to re-apply the Ka and Ba to the data that has been acquired.

Figure 8:
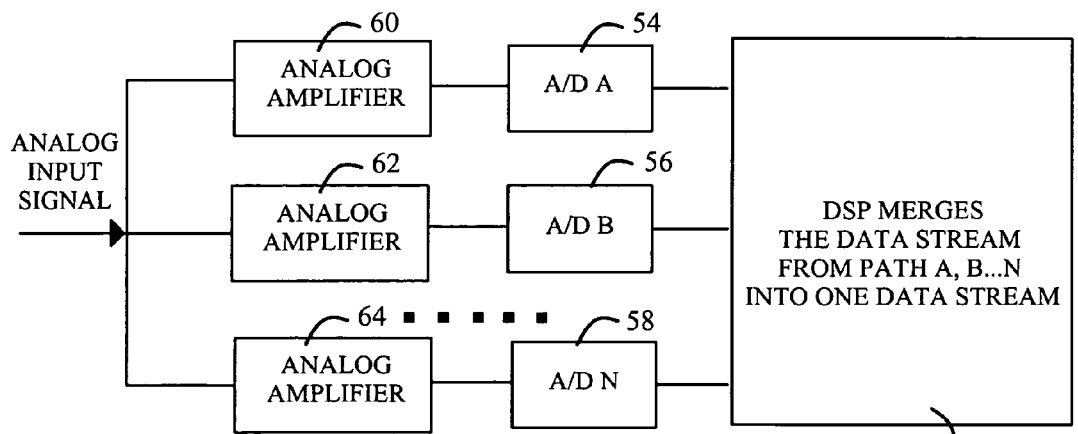
FIG. 8 is an embodiment of the invention with more than two analog-to-digital paths.

The previous discussion uses a measurement channel with two A/D paths as an example. The concept can be expanded to measurement systems which employ more than two A/D paths. Regardless of the number of paths, the cross-calibration method uses the measurement values in the paths with smaller input ranges (i.e., larger gains) to calibrate the data values from the paths with larger input ranges (i.e., with smaller gains). FIG. 8 shows this expansion of the invention to include three A/D paths, with each path having an ADC 54, 56 and 58 and an amplifier 60, 62 and 64 with a unique gain.

What is claimed is:

1. A method of calibrating a measurement system comprising:
    directing an input signal through at least two paths having different intended levels of circuit gain, said paths including first and second paths, said paths having digital outputs of measurement values at corresponding measurement points;
    performing cross-path calibration of said at least two paths, including adjusting said measurement values of said first path with said measurement values of said second path for at least some of said corresponding measurement points; and
    generating a calibrated final data stream from said digital outputs of said at least two paths, including selecting among said measurement values at said measurement points, said selecting being based on magnitudes of said measurement values at said corresponding measurement points;
    wherein said second path has a higher intended level of circuit gain than said first path, said cross-path calibration including discarding said measurement values of said digital output from said second path when said measurement values include saturation.

2. The method of claim 1 wherein performing cross-path calibration and generating said calibrated final data stream include defining a first range of said measurement values in which said second path is determined to be more accurate than said first path when said digital output of said second path outputs measurement values within said second range, said cross-path calibration further including defining a first range of said measurement values in which said first path is determined to be more accurate.

3. The method of claim 2 wherein performing cross-path calibration includes enabling said calibration for said measurement values that are proximate to a transition between said first range and said second range.

4. The method of claim 3 wherein said cross-path calibration includes addressing gain errors and offset errors of said first and second paths.

5. The method of claim 2 wherein generating said calibrated final data stream includes being preferential to said digital output of said second path when said measurement values are within said second range, and being preferential to an adjusted digital output of said first path when the measurement values from the second path are saturated.

6. The method of claim 1 wherein directing said input signal includes introducing a single analog signal to each said path, each said path including an analog-to-digital converter.

7. The method of claim 6 further comprising using a single clock source for operations of circuitry of said paths, thereby controlling time jitter.

8. A method of calibrating a measurement system comprising:
    directing an input signal through at least two paths having different intended levels of circuit gain, said paths including first and second paths, said paths having digital outputs of measurement values at corresponding measurement points;
    performing cross-path calibration of said at least two paths, including adjusting said measurement values of said first path with said measurement values of said second path for at least some of said corresponding measurement points; and
    generating a calibrated final data stream from said digital outputs of said at least two paths, including selecting among said measurement values at said measurement points, said selecting being based on magnitudes of said measurement values at said corresponding measurement points;
    wherein performing said cross-path calibration is applied to an input data stream that was previously acquired and has known signal properties.

9. A method of calibrating a measurement system comprising:
    directing an input signal through at least two paths having different intended levels of circuit gain, said paths including first and second paths, said paths having digital outputs of measurement values at corresponding measurement points;
    performing cross-path calibration of said at least two paths, including adjusting said measurement values of said first path with said measurement values of said second path for at least some of said corresponding measurement points; and
    generating a calibrated final data stream from said digital outputs of said at least two paths, including selecting among said measurement values at said measurement points, said selecting being based on magnitudes of said measurement values at said corresponding measurement points;
    wherein performing said cross-path calibration is applied to a data stream concurrently being acquired.

10. A method of calibrating a measurement system comprising:
    directing an input signal through at least two paths having different intended levels of circuit gain, said paths including first and second paths, said paths having digital outputs of measurement values at corresponding measurement points;
    performing cross-path calibration of said at least two paths, including adjusting said measurement values of said first path with said measurement values of said second path for at least some of said corresponding measurement points; and
    generating a calibrated final data stream from said digital outputs of said at least two paths, including selecting among said measurement values at said measurement points, said selecting being based on magnitudes of said measurement values at said corresponding measurement points;
    wherein performing said cross-path calibration is recurringly executed, such that estimations of error are recurringly determined.

11. A measurement system comprising:
    a measurement channel for receiving an input signal;
    a first path having a first analog-to-digital converter (ADC) and a first gain factor, said first path being connected to said measurement channel to receive said input signal;
    a second path having a second ADC and a second gain factor greater than said first gain factor, said second path being connected to said measurement channel to receive said input signal; and
    processing circuitry enabled to:
        (a) provide cross-path calibration in which measurement values from one of said first and second paths are used to determine calibration with respect to the other of said first and second paths; and (b) generate a final data stream by alternating between said measurement values from said first path and said measurement values from said second path on a basis of magnitudes of said measurement values and avoiding selections of saturated values;

wherein said processing circuitry is enabled to be preferential to selection of said second path in generating said final data stream, while selecting said second path so as to avoid said saturated values.

12. The measurement system of claim 11 wherein each of said first path and said second path includes an amplifier which defines said gain factor of said respective path.

13. A measurement system comprising:

a measurement channel for receiving an input signal;

a first path having a first analog-to-digital converter (ADC) and a first gain factor, said first path being connected to said measurement channel to receive said input signal;

a second path having a second ADC and a second gain factor greater than said first gain factor, said second path being connected to said measurement channel to receive said input signal; and processing circuitry enabled to:
(a) provide cross-path calibration in which measurement values from one of said first and second paths are used to determine calibration with respect to the other of said first and second paths; and
(b) generate a final data stream by alternating between said measurement values from said first path and said measurement values from said second path on a basis of magnitudes of said measurement values and avoiding selections of saturated values;

wherein said processing circuitry is configured to use data of said second path to adjust data of said first path.

14. A measurement system comprising:

a measurement channel for receiving an input signal;

a first path having a first analog-to-digital converter (ADC) and a first gain factor, said first path being connected to said measurement channel to receive said input signal;

a second path having a second ADC and a second gain factor greater than said first gain factor, said second path being connected to said measurement channel to receive said input signal;

at least one additional path having a gain factor different than said first and second gain factors; and processing circuitry enabled to:
(a) provide cross-path calibration in which measurement values from one of said first and second paths are used to determine calibration with respect to the other of said first and second paths, said processing circuitry being further enabled to extend said cross-path calibration to each said additional path; and
(b) generate a final data stream by alternating among said measurement values from said first, second and additional paths on a basis of magnitudes of said measurement values and avoiding selections of saturated values.

* * * * *